(12) United States Patent
Kim et al.

(10) Patent No.: US 11,262,611 B2
(45) Date of Patent: Mar. 1, 2022

(54) LIQUID CRYSTAL ELEMENT

(71) Applicant: ELECTRONICS AND TELECOMMUNICATIONS RESEARCH INSTITUTE, Daejeon (KR)

(72) Inventors: Gi Heon Kim, Daejeon (KR); Won Jae Lee, Daejeon (KR); Chi-Sun Hwang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 17 days.

(21) Appl. No.: 16/917,454

(22) Filed: Jun. 30, 2020

(65) Prior Publication Data

US 2021/0063785 A1 Mar. 4, 2021

(30) Foreign Application Priority Data

Sep. 3, 2019 (KR) .................. 10-2019-0108571

(51) Int. Cl.
*G02F 1/1334* (2006.01)
*G02F 1/1343* (2006.01)

(52) U.S. Cl.
CPC ...... *G02F 1/1334* (2013.01); *G02F 1/134309* (2013.01); *G02F 2202/04* (2013.01)

(58) Field of Classification Search
CPC ............... G02F 1/1334; G02F 1/13342; G02F 2202/04; G02F 1/134309
See application file for complete search history.

(56) References Cited

U.S. PATENT DOCUMENTS

| 8,420,182 | B2 | 4/2013 | Jang et al. |
| 8,675,167 | B2 | 3/2014 | Jang et al. |
| 9,695,362 | B1* | 7/2017 | Kim ............ C09K 19/605 |
| 2011/0039032 | A1* | 2/2011 | Jang ............ C09K 19/60 427/493 |
| 2012/0229730 | A1 | 9/2012 | Kim et al. |
| 2014/0002777 | A1 | 1/2014 | Kim et al. |

(Continued)

FOREIGN PATENT DOCUMENTS

| KR | 20-0340520 Y1 | 2/2004 |
| KR | 10-2015-0042345 A | 4/2015 |

(Continued)

*Primary Examiner* — Jia X Pan
(74) *Attorney, Agent, or Firm* — Rabin & Berdo, P.C.

(57) ABSTRACT

Provided is a liquid crystal element. The liquid crystal element includes a first substrate, a first electrode provided on the first substrate, a liquid crystal layer provided on the first electrode and including a liquid crystal portion and a hydrophobic portion, and a second electrode on the liquid crystal layer, wherein the hydrophobic portion is phase-separated from the liquid crystal portion, wherein the liquid crystal portion includes polymer materials, a first dye, and liquid crystal molecules dispersed in the polymer materials, wherein the hydrophobic portion is spaced apart from the first electrode, wherein the hydrophobic portion includes hydrophobic materials and a second dye, wherein the first dye is dissolved in the polymer materials, wherein the second dye is dissolved in the hydrophobic portion, wherein the polymer materials include photo-curable polymer materials.

15 Claims, 7 Drawing Sheets

(56) References Cited

U.S. PATENT DOCUMENTS

2016/0154259 A1* 6/2016 Kim .................. G02F 1/134363
                                                        257/40
2017/0261778 A1* 9/2017 Lan ..................... G02F 1/1335
2018/0136507 A1* 5/2018 Kim ..................... C09K 19/60
2019/0137799 A1* 5/2019 Kim ..................... C09K 19/603

FOREIGN PATENT DOCUMENTS

| KR | 10-1520396 B1 | 5/2015 |
| KR | 10-1584663 B1 | 1/2016 |
| KR | 10-1598539 B1 | 3/2016 |
| KR | 10-2019-0052531 A | 5/2019 |

\* cited by examiner

LIQUID CRYSTAL ELEMENT

CROSS-REFERENCE TO RELATED APPLICATIONS

This U.S. non-provisional patent application claims priority under 35 U.S.C. § 119 of Korean Patent Application No. 10-2019-0108571, filed on Sep. 3, 2019, the entire contents of which are hereby incorporated by reference.

BACKGROUND

The present disclosure herein relates to a liquid crystal element, and more particularly, to a liquid crystal layer of a liquid crystal element.

Liquid crystals may be substances in a mesophase between crystals and liquids. The name "liquid crystal" is derived from properties of the liquidity of liquid and the anisotropy of crystal. Liquid crystals have order in the position and orientation of particles in a crystalline state. However, liquid crystals have a disordered position and orientation in a liquid state.

As a method of implementing a three-dimensional image, holography, stereoscopy, and integral imaging techniques are being developed. The holography method is known to be the most ideal method for users to feel stereoscopic images without fatigue. The holography method expresses the distance and the depth through the optical interference phenomenon. The holography method requires a spatial light modulator (SLM) and the SLM functions to adjust the transmittance of the incident light or to output the phase information of the light.

SUMMARY

The present disclosure provides a liquid crystal element capable of realizing a color image without a color filter or polarizer.

The present disclosure also provides a liquid crystal element that minimizes light loss.

An embodiment of the inventive concept provides a liquid crystal element including: a first substrate; a first electrode provided on the first substrate; a liquid crystal layer provided on the first electrode and including a liquid crystal portion and a hydrophobic portion; and a second electrode on the liquid crystal layer, wherein the hydrophobic portion is phase-separated from the liquid crystal portion, wherein the liquid crystal portion includes polymer materials, a first dye, and liquid crystal molecules dispersed in the polymer materials, wherein the hydrophobic portion is spaced apart from the first electrode, wherein the hydrophobic portion includes hydrophobic materials and a second dye, wherein the first dye is dissolved in the polymer materials, wherein the second dye is dissolved in the hydrophobic portion, wherein the polymer materials include photo-curable polymer materials.

In an embodiment, the photo-curable polymer material may be cured by ultraviolet light.

In an embodiment, the ultraviolet light may have a wavelength of 250 nm or more and 400 nm or less.

In an embodiment, the substrate may have a plurality of pixel areas, wherein each of the pixel areas may have a first area and a second area, wherein the first area may overlap the first electrode vertically, wherein in a planar perspective, the second area may surround the first area.

In an embodiment, a first voltage may be applied to the first electrode, wherein a second voltage different from the first voltage may be applied to the second electrode, wherein the liquid crystal molecules may be vertically aligned with each other, wherein a refractive index of the polymer materials may coincide with a refractive index of the liquid crystal molecules.

In an embodiment, the hydrophobic portion may overlap the second area vertically, wherein in a planar perspective, the hydrophobic portion may be spaced apart from the first area.

In an embodiment, the liquid crystal layer may be transparent, wherein light incident on the liquid crystal layer may be transmitted through the liquid crystal layer.

In an embodiment, the hydrophobic portion may overlap the second area vertically, wherein the liquid crystal molecules may be arranged in disorder.

In an embodiment, the liquid crystal molecules may overlap the first area in a planar perspective, wherein a refractive index of the polymer materials may be different from a refractive index of the liquid crystal molecules.

In an embodiment, the first dye may have a first color, wherein the second dye may have a second color different from the first color, wherein light transmitted through the liquid crystal layer may have a mixed color of the first color and the second color.

In an embodiment, light having the first color may have a first wavelength, wherein light having the second color may have a second wavelength, wherein a light intensity of the light having the first wavelength may be greater than a light intensity of the light having the second wavelength.

In an embodiment, a dielectric constant of the hydrophobic portion may be lower than a dielectric constant of the liquid crystal portion, wherein the hydrophobic portion may have a dielectric constant of 1 or more and 3 or less.

In an embodiment, a thickness of the liquid crystal layer may be 2.5 um or more and 60 um or less.

In an embodiment, a refractive index of the hydrophobic portion may be different from a refractive index of the liquid crystal portion, wherein the refractive index of the hydrophobic portion may be 1.25 or more and 1.45 or less.

In an embodiment, the second dye may be contained in 0.001 wt % or more and 50 wt % or less of the hydrophobic portion.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In order to fully understand the configuration and effects of the technical spirit of the inventive concept, preferred embodiments of the technical spirit of the inventive concept will be described with reference to the accompanying drawings. However, the technical spirit of the inventive concept is not limited to the embodiments set forth herein and may be implemented in various forms and various modifications may be applied thereto. Only, the technical spirit of the inventive concept is disclosed to the full through the description of the embodiments, and it is provided to those skilled in the art that the inventive concept belongs to inform the scope of the inventive concept completely. Those of ordinary skill in the art will understand that the concepts of the inventive concept may be practiced in any suitable environment.

The terms used in this specification are used only for explaining specific embodiments while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, when a film (or layer) is referred to as being on another film (or layer) or substrate, it may be directly on the other film (or layer) or substrate, or a third film (or layer) may be interposed.

It will be understood that the terms "first", "second", and "third" are used herein to describe various regions, films (or layers), and so on, but these regions, films (or layers), and so on should not be limited by these terms. These terms are only used to distinguish any predetermined region or film (or layer) from another region or film (or layer). Thus, a membrane referred to as a first membrane in one embodiment may be referred to as a second membrane in another embodiment. Embodiments described herein include complementary embodiments thereof. Like reference numerals refer to like components throughout the specification.

Unless otherwise the terms used in embodiments of the inventive concept are defined differently, they may be interpreted as commonly known to those skilled in the art.

Hereinafter, a liquid crystal element and its operation method according to the concept of the inventive concept will be described.

Figure 1:
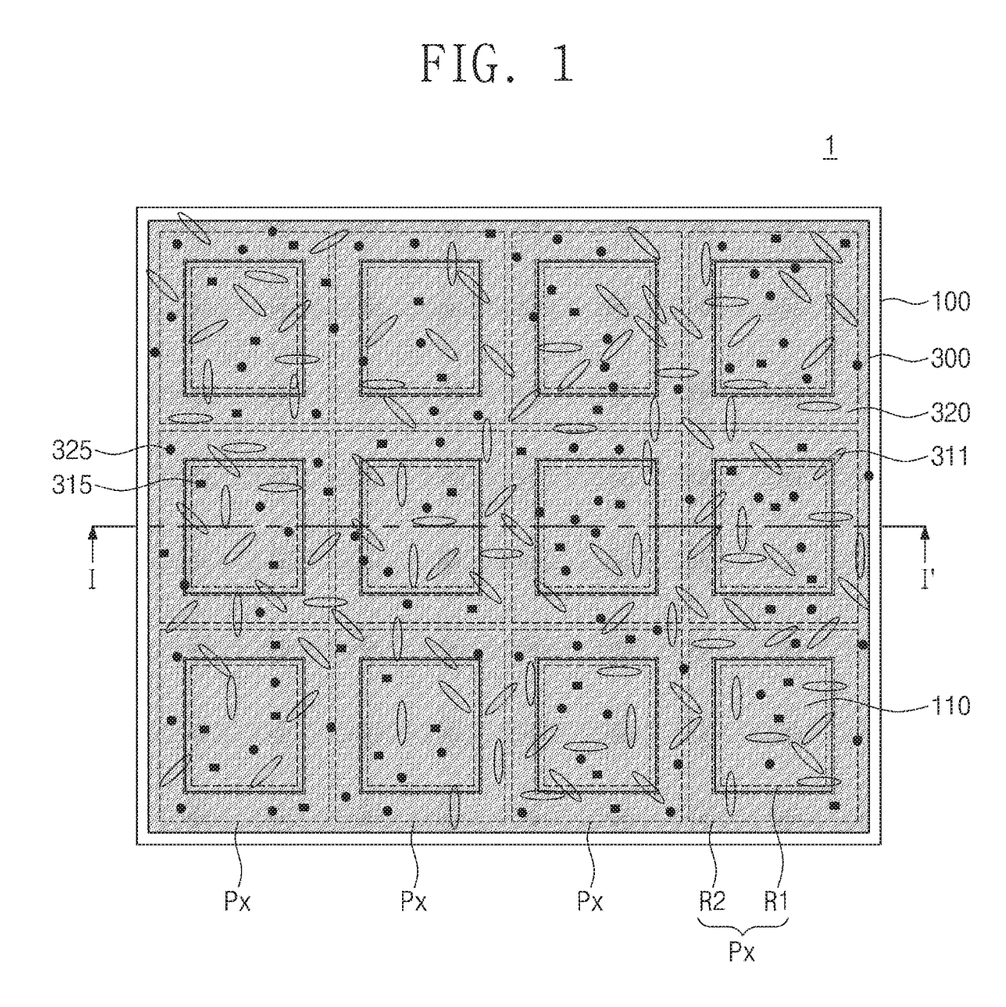
FIG. 1 is a plan view illustrating a method of manufacturing a liquid crystal element according to an embodiment of the inventive concept.
Figure 2:
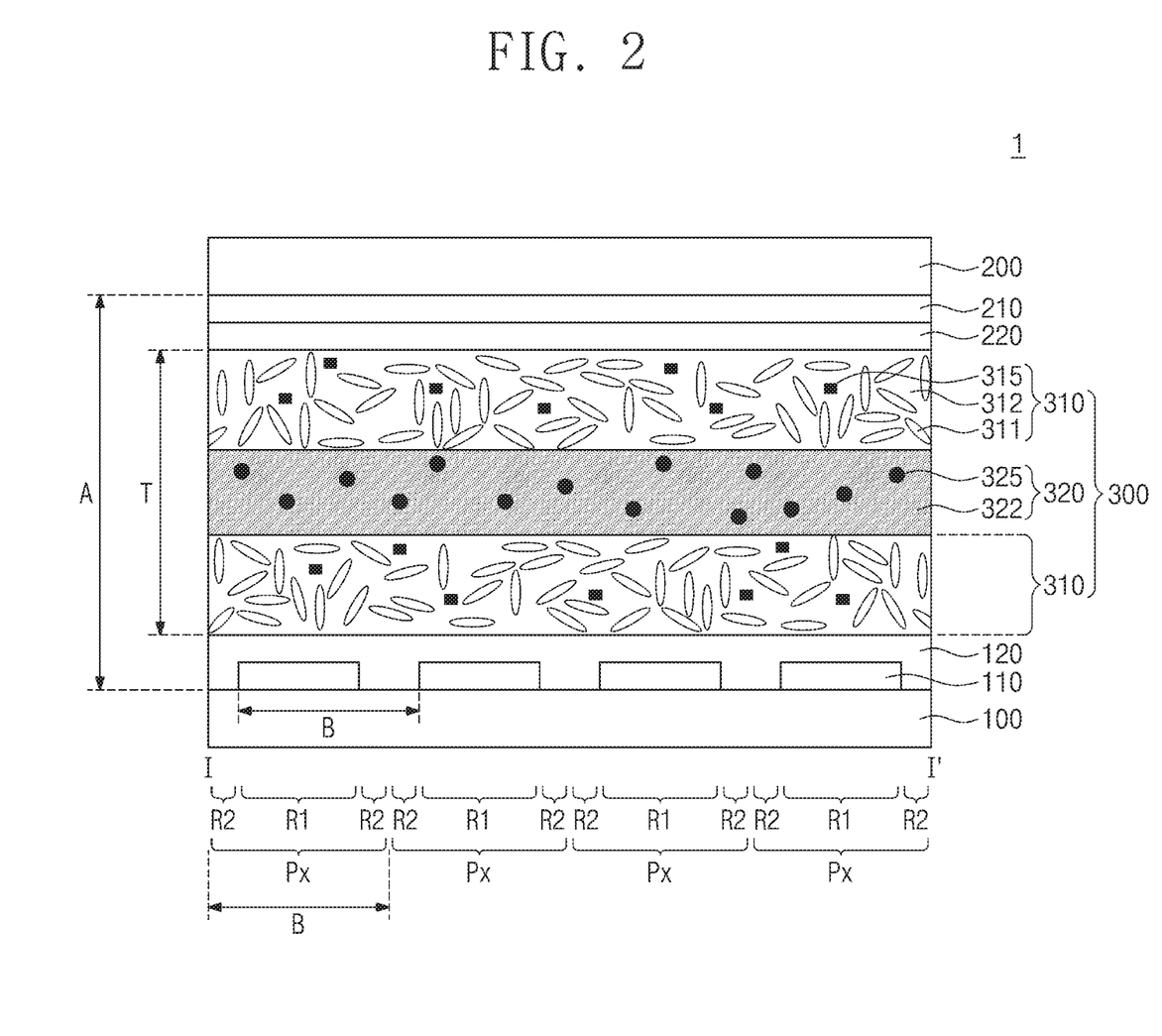
FIG. 2 is a cross-sectional view taken along line I-I' of FIG. 1.
Figure 3:
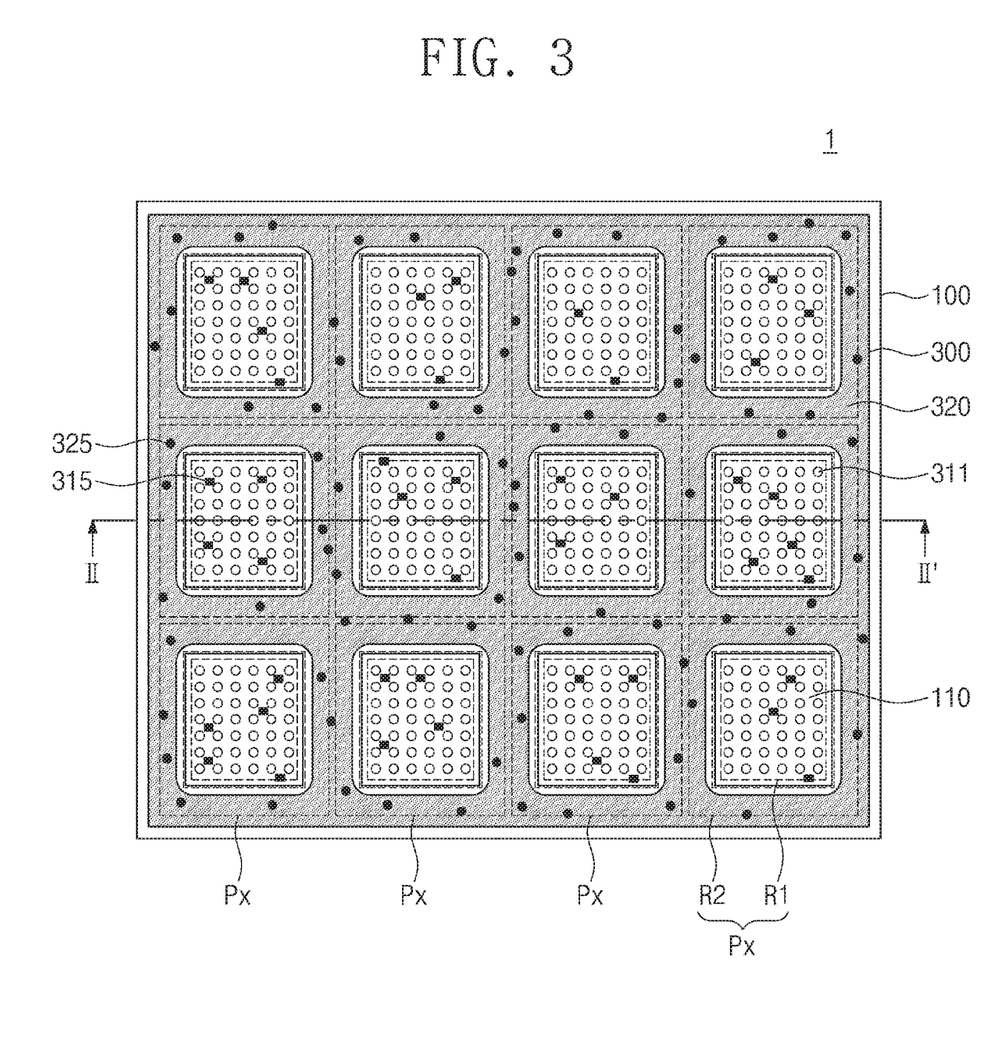
FIG. 3 is a plan view showing a liquid crystal element according to an exemplary embodiment.
Figure 4:
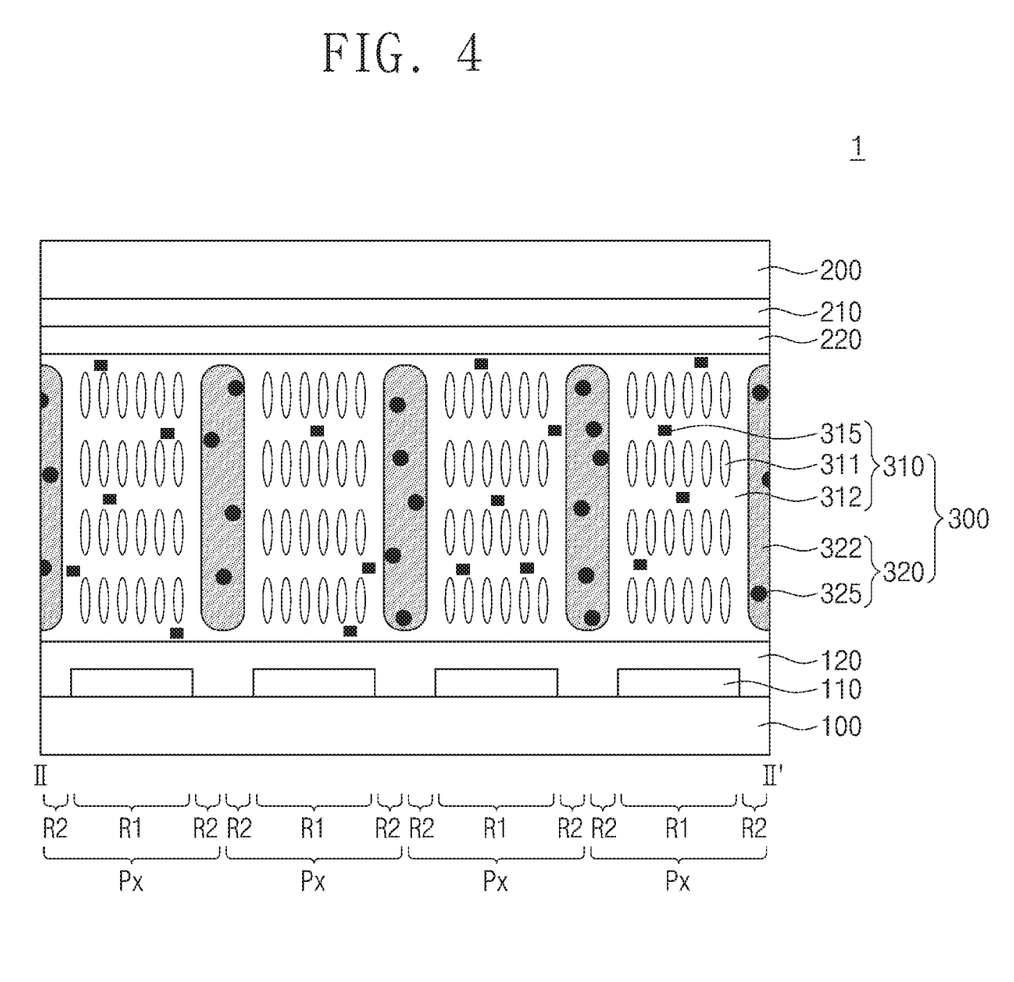
FIG. 4 is a cross-sectional view taken along line II-II' of FIG. 3.

FIG. 1 is a plan view for explaining a method of manufacturing a liquid crystal element according to an embodiment of the inventive concept. FIG. 2 is a cross-sectional view taken along line I-I' of FIG. 1. FIG. 3 is a plan view showing a liquid crystal element according to an embodiment. FIG. 4 is a cross-sectional view taken along line II-II' of FIG. 3.

Referring to FIGS. 1 and 2, a liquid crystal element 1 includes a first substrate 100, a first electrode 110, a liquid crystal layer 300, a second electrode 210, and a second substrate 200, which are stacked. The first substrate 100 may have a plurality of pixel areas Px from a planar perspective, as shown in FIG. 1. Each of the pixel areas Px may include a first area R1 and a second area R2. In each pixel area Px, the second area R2 may surround the first area R1. The width B of the pixel areas Px may be equal to or less than the interval A between the first substrate 100 and the second substrate 200. The width B of the pixel areas Px may have a value substantially equal to the pitch of the pixel areas Px. Here, the first electrode 110 may include a plurality of first electrodes 110, and the pitch of the pixel areas Px may mean the pitch between two adjacent first electrodes 110. Hereinafter, in order for simple description, a single first electrode 110 will be described. The first substrate 100 may be transparent. The first substrate 100 may include an organic matter or an inorganic matter. The first substrate 100 may include, for example, a plastic, a polymer, or a glass.

The first electrode 110 may be disposed on the first substrate 100. The first electrode 110 may have a rectangular shape as shown in FIG. 1A. As another example, the planar shape of the first electrode 110 may be variously modified, such as a circular shape, an elliptical shape, or a hexagonal shape. The first electrode 110 may overlap the first area R1 of the first substrate 100 in a planar perspective, and may cover the first area R1 of the first substrate 100. The first electrode 110 may not overlap the second area R2 of the first substrate 100 in a planar perspective. As illustrated in FIG. 2, the first electrode 110 may expose the second area R2 of the first substrate 100. The first electrode 110 may be transparent. The first electrode 110 may include a conductive material. For example, the first electrode 110 may include indium tin oxide (ITO), indium zinc oxide (IZO), silver nanowire (AgNW), aluminum (Al), carbon nanotubes, graphene, polypolystyrene sulfonate (PEDOT:PSS), polyaniline, and/or polythiophene. The first electrode 110 may be formed of a single film or a multilayer film.

The first interface control layer 120 may be disposed on the first electrode 110. The first interface control layer 120 may cover the first electrode 110 and the second area R2 of the first substrate 100 exposed by the first electrode 110. The second interface control layer 220 may be vertically spaced from the first interface control layer 120. The first interface control layer 120 and the second interface control layer 220 may include an organic alignment material or an inorganic alignment material. The organic alignment material may include a polymer such as polyimide or polyvinyl alcohol. The inorganic alignment material may include silicon oxide (SiO), silicon nitride (SiN), silicon oxynitride (SION), or aluminum oxide (AlO). The second interface control layer 220 may include the same as or different materials than the first interface control layer 120. The first interface control layer 120 and the second interface control layer 220 may have a contact angle with water of 80 degrees or less. The first interface control layer 120 and the second interface control layer 220 may be omitted.

The second electrode 210 may be provided on the liquid crystal layer 300. The second electrode 210 may overlap the first area R1 and the second area R2 of the first substrate 100 in a planar perspective. The second electrode 210 may function as a common electrode. The second electrode 210 may be transparent. The second electrode 210 may include indium tin oxide (ITO), indium zinc oxide (IZO), silver nanowire (AgNW), aluminum (Al), carbon nanotubes, graphene, polypolystyrene sulfonate (PEDOT:PSS), polyaniline, and/or polythiophene. The second electrode 210 may be formed of a single film or a multilayer film.

The second substrate 200 may be disposed on the second electrode 210. The second substrate 200 may include an organic matter or an inorganic matter. The second substrate 200 may further include an ultraviolet blocking layer (not shown) or an infrared reflective layer (not shown). The ultraviolet blocking layer may include a polymer, an inorganic material, and/or ceramic. The ultraviolet blocking rate of the ultraviolet blocking layer may be 50% or more and 99.9% or less.

The liquid crystal layer 300 may be injected between the first substrate 100 and the second substrate 200. More specifically, the liquid crystal layer 300 may be injected between the first interface control layer 120 and the second interface control layer 220. The thickness T of the liquid crystal layer 300 may be 2.5 µm or more and 60 µm or less. The liquid crystal layer 300 may include a liquid crystal portion 310 and a hydrophobic portion 320 phase-separated from each other. The liquid crystal layer 300 may be disposed on the pixel areas Px of the first substrate 100. The liquid crystal layer 300 may overlap the first area R1 and the second area R2 of each of the pixel areas Px of the first substrate 100 in a planar perspective. More specifically, the liquid crystal portion 310 and the hydrophobic portion 320 may overlap the first area R1 and the second area R2 of each pixel area Px in a planar perspective. The liquid crystal layer 300 may be in a state in which there is no extra external force (for example, an electric field). The intensity of the interaction between the first and second interface control layers 120 and 220 and the hydrophobic portion 320 may be different from the intensity of the interaction between the first and second interface control layers 120 and 220 and the liquid crystal portion 310. For example, the affinity between the first and second interface control layers 120 and 220 and the liquid crystal portion 310 may be greater than the affinity between the first and second interface control layers 120 and 220 and the hydrophobic portion 320'. Accordingly, the hydrophobic portion 320' may be spaced apart from the first interface control layer 120 and the second interface control layer 220. The liquid crystal portion 310 may include a plurality of liquid crystal portions 310. The liquid crystal portions 310 may be provided between the hydrophobic portion 320' and the first interface control layer 120 or between the hydrophobic portion 320' and the second interface control layer 220. The liquid crystal portions 310 may physically contact the first interface control layer 120 or the second interface control layer 220. Hereinafter, single liquid crystal portions 310 will be described.

The liquid crystal portion 310 may include liquid crystal molecules 311, polymer materials 312, and a first dye 315. The liquid crystal molecules 311 may have a positive dielectric constant or a negative dielectric constant. The liquid crystal molecules 311 may have a weight of 0.5 times or more and 9 times or less with respect to the weight of the polymer materials 312. The liquid crystal molecules 311 may be nematic liquid crystals. The nematic liquid crystal may be at least one selected from biphenyl, phenyl cyclo hexyl, taphenyl, tran, pyrimidine, and stilbene. The liquid crystal layer 300 may further include ultraviolet photoinitiators. The ultraviolet photoinitiators can improve the cure rate of polymeric materials 312. The photoinitiators may have a weight of 0.01 times or more and 0.2 times or less with respect to the weight of the polymer materials 312.

The polymer materials 312 may be in the form of a precursor of a polymer that is cured by ultraviolet light. More specifically, the polymer materials 312 may be amorphous or semi-crystalline monomers or oligomers. Preferably, they may include urethane acrylate oligomer having a molecular weight of 300 or more and 100,000 or less, 1,6-hexandiol diacrylate (HAD), 2-hydroxyethyl methacrylate (2-HEMA), 2-ethylheeth acrylate, hydroxyethyl acrylate (HEA), Methyl methacrylate (MMA), Methacrylate (MA), Isobornyl acrylate (IOBA), 2(2-ethoxyethoxy) ethyl acrylate (EOEOEA), Triethylopropane triacrylate (TMPTA), Trimethylolpropane diallyl ether (TMPDE), Tri (propylene glycol) Diacrylate (TPGDA), Penthaerithritol Triacrylate (PETA), Ethylene glycol dimethacrylate (EGDA), Triethylopropane trimethacrylate (TMPTMA), 2-phenoxyethyl acrylate (2-PEA), Trimethylolpropane Ethoxylate Triacrylate (TMPEOTA), tetrahydrofurfuryl acrylate (THFA), and/or urethane diacrylate.

The polymer materials 312 may further include additives. The additives may include, for example, surfactants, anti-foaming agents, UV stabilizers, and/or viscosity modifiers. The additives may have a weight of 0.001 times or more and 1 times or less with respect to the weight of the polymer materials 312. Ultraviolet lights may be irradiated to the polymer materials 312. The polymer materials 312 may be cured by ultraviolet light. The wavelength of the ultraviolet light may be 250 nm or more and 400 nm or less.

The first dye 315 may be dissolved in the liquid crystal portion 310. More specifically, the first dye 315 may be selectively dissolved in the polymer materials 312 in the liquid crystal portion 310. The first dye 315 may have a weight of 0.001% or more and 5% or less with respect to the weight of the polymer materials 312. The first dye 315 may have a blue color. For example, the first dye 315 may be represented by <Formula 1> below.

<Formula 1>

(In <Formula 1>, R1, R2, R3, and R4 may each independently be one of —NH2, —NHRa (wherein Ra is an alkyl group having 1 to 4 carbon atoms), —H, —OH, linear or branched alkyl groups having 1 to 10 carbon atoms, linear or branched alkenyl groups having 3 to 10 carbon atoms, and aromatic groups selected from <Formula 2> below.)

<Formula 2>

As another example, the first dye 315 may be represented by <Formula 3> below.

<Formula 3>

(In <Formula 3>, R5 may be one selected from —SO₃Na and —SO₃H. R6 may be one selected from —NH₂, —NHCH₃, and —NHC₆H₅.)

The first dye 315 may have a red color. For example, the first dye 315 may be represented by <Formula 4> below.

<Formula 4>

(In <Formula 4>, R7 may be one selected from Cr, Mo, W, Mn, V, Nb, and Ta. In <Formula 4>, R8, R9, R10, and R11 may each independently be —NO₂, —NH₃, —NHRb (Rb is an alkyl group having 1 to 4 carbon atoms), and an aromatic group selected from <Formula 5> below. In <Formula 4>, R12 may be one of —SO₃Na and —SO₃H.)

<Formula 5>

As another example, the first dye 315 may be represented by <Formula 6> below.

<Formula 6>

(In <Formula 6>, R13 may be one of —COOH and —COONa. In <Formula 6> above, R14 and R15 may include hydrogen, methyl group, ethyl group, linear or branched alkyl groups having 3 to 10 carbon atoms, linear or branched alkenyl groups having 3 to 10 carbon atoms, —NH₂, —NHRc (Rc is an alkyl group having 1 to 4 carbon atoms.), and aromatic groups selected from <Formula 7> below. In <Formula 6>, R16 may be one of —H, —OH, —SO₃H, and —COOH.)

<Formula 7>

The first dye 315 may have a green color. For example, the first dye 315 may be represented by <Formula 8> below.

<Formula 8>

In <Formula 8>, R17 and R18 may each independently be selected from <Formula 9> below.

<Formula 9>

The hydrophobic portion 320 may include hydrophobic materials 322 and a second dye 325. Hydrophobicity in this specification means that the contact angle to water is greater than 90 degrees. The hydrophobic materials 322 can include, for example, a fluorine-containing polymer. The hydrophobic materials 322 may include, for example, a polymer polymerized from at least one monomer selected from the group consisting of tetrafluoroethylene, trifluoroethylene, difluoroethylene, 2,2-bisfluoromethyl-4,5-difluoro-1,3-dixole, and chlorotrifluoroethylene. The hydrophobic materials 322 may exhibit more nonpolarity than the liquid crystal molecules 311. The hydrophobic materials 322 may have a lower dielectric constant than the liquid crystal molecules 311. The hydrophobic materials 322 may have a dielectric constant of 1 to 3, for example. The liquid crystal molecules 311 may have a dielectric constant of 5 to 40, for example. In this specification, the refractive index and dielectric constant of the liquid crystal portion 310 may be substantially the same as the refractive index and dielectric constant of the liquid crystal molecules 311, respectively. The refractive index of the hydrophobic portion 320 may be different from that of the liquid crystal portion 310. The refractive index of the hydrophobic portion 320 may be smaller than that of the liquid crystal portion 310. For example, the refractive index of the hydrophobic portion 320 may be 1.25 to 1.45, and the refractive index of the liquid crystal portion 310 may be 1.45 to 1.55. In this specification, the refractive index and dielectric constant of the hydrophobic portion 320 may be substantially the same as the refractive index and dielectric constant of the hydrophobic materials 322, respectively. The hydrophobic portion 320 may be amorphous. The hydrophobic portion 320 may be transparent. The hydrophobic portion 320 may be in a liquid state.

The second dye 325 may be selectively dissolved in the hydrophobic portion 320. The second dye 325 is similar to the first dye 315, but may have a structure including a hydrophobic functional group. The second dye 325 may be a non-ionic material. For example, the second dye 325 may have an anthraquinone or azo benzene structure. The diameter of the second dye 325 may be 0.1 um or more and 2 um or less. The second dye 325 may have a weight of 0.00001 times or more and 0.1 times or less with respect to the hydrophobic portion 320.

Referring to FIGS. 3 and 4, voltages may be applied to the first electrode 110 and the second electrode 210. Accordingly, an electric field may be formed in the liquid crystal layer 300. The hydrophobic portion 320 may not overlap the first areas R1 of the pixel areas Px. The hydrophobic portion 320 may overlap the second areas R2 of the pixel areas Px. The hydrophobic portion 320 may function as partition walls partitioning the pixel areas Px. That is, the second areas R2 of the pixel areas Px may function as separate areas defining the respective pixel areas Px. The hydrophobic materials may prevent/reduce the occurrence of cross talk between the liquid crystal molecules 311 of different pixel areas Px. Accordingly, the resolution of the liquid crystal element 1 may be improved. Since the hydrophobic portion 320 partitions the liquid crystal molecules 311 of the first areas R1 of the pixel areas Px by the voltage difference, a separate partition wall may not be provided in the liquid crystal layer 300. Accordingly, the liquid crystal layer 300 may be miniaturized. The partition wall forming process may be omitted, so that the production of the liquid crystal element 1 may be further simplified. Although the pixel areas Px of the first substrate 100 have a fine pitch, the hydrophobic portion 320 may well partition the pixel areas Px. The width B of the pixel areas Px of the liquid crystal element 1 is reduced so that the resolution of the liquid crystal element 1 may be further improved.

When an electric field is formed in the liquid crystal layer 300, the liquid crystal molecules 311 may be aligned. At this point, the aligned liquid crystal molecules 311 may be disposed at positions where the electric field strongly acts, that is, between the first electrode 110 and the second electrode 210. The aligned liquid crystal molecules 311 may be disposed on a portion vertically overlapping the first electrode 110. The aligned liquid crystal molecules 311 may strongly interact with other adjacent liquid crystal molecules 311. Accordingly, adjacent liquid crystal molecules 311 may be gathered on a portion vertically overlapping the first electrode 110, and then aligned. The polymer materials 312 have high miscibility with the liquid crystal molecules 311, and the first dyes 315 may be selectively dissolved in the polymer materials. Accordingly, the polymer materials 312 and the first dyes 315 may overlap the first areas R1 of the pixel areas Px of the first substrate 100 in a planar perspective. The hydrophobic portion 320 may have a low dielectric constant (e.g., a dielectric constant of 1 to 3). The hydrophobic portion 320 may be pushed toward a portion (for example, the second area R2) that does not overlap the first electrode 110 by the liquid crystal molecules 311. Accordingly, the second dye 325 may overlap the second area R2 vertically.

Ultraviolet light may be irradiated to the liquid crystal layer 300. The polymer materials 312 in the liquid crystal layer 300 may be cured by ultraviolet light. Accordingly, the hydrophobic portion 320 may be fixed while vertically overlapping the second area. The liquid crystal element 1 may be manufactured through the above manufacturing process.

Hereinafter, the operation of the liquid crystal element 1 will be described.

Figure 5:
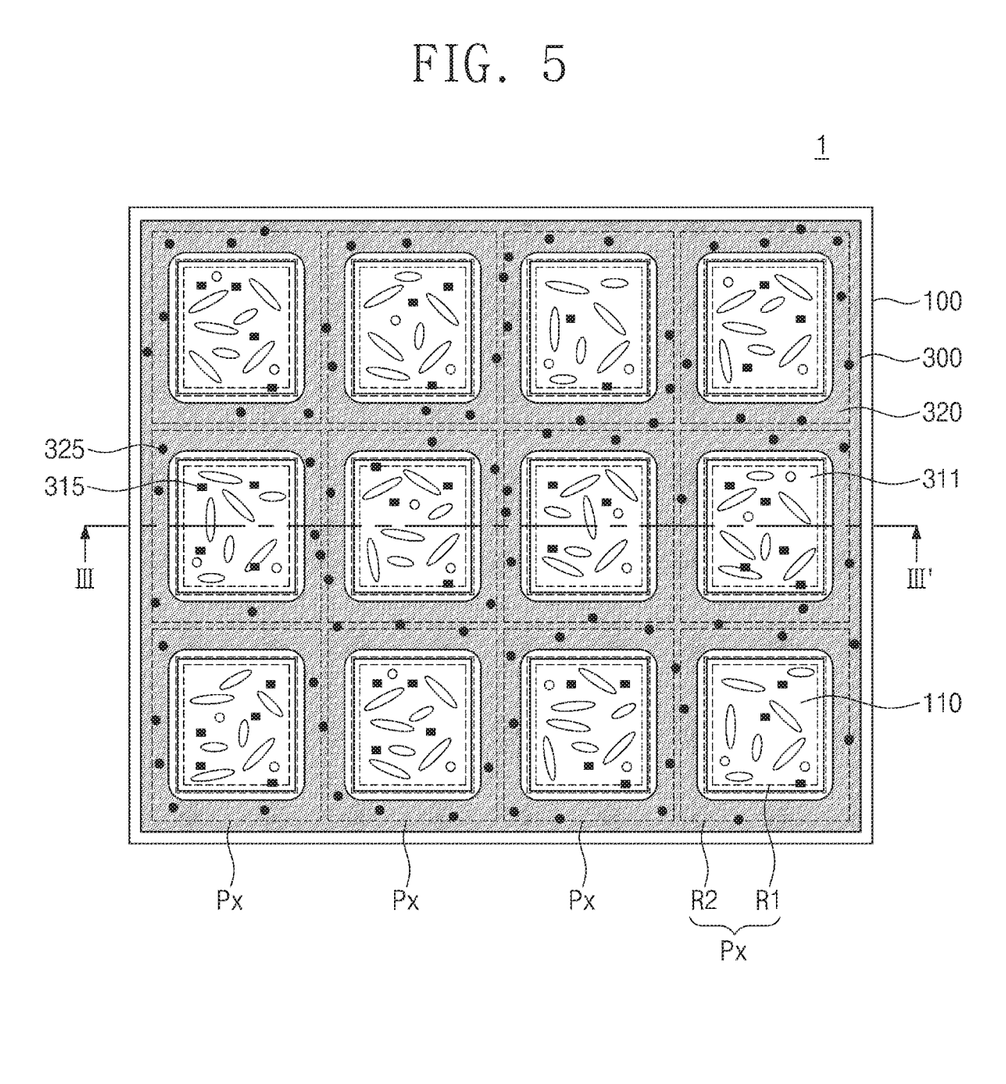
FIG. 5 is a plan view illustrating a method of operating a liquid crystal element according to an embodiment.
Figure 6:
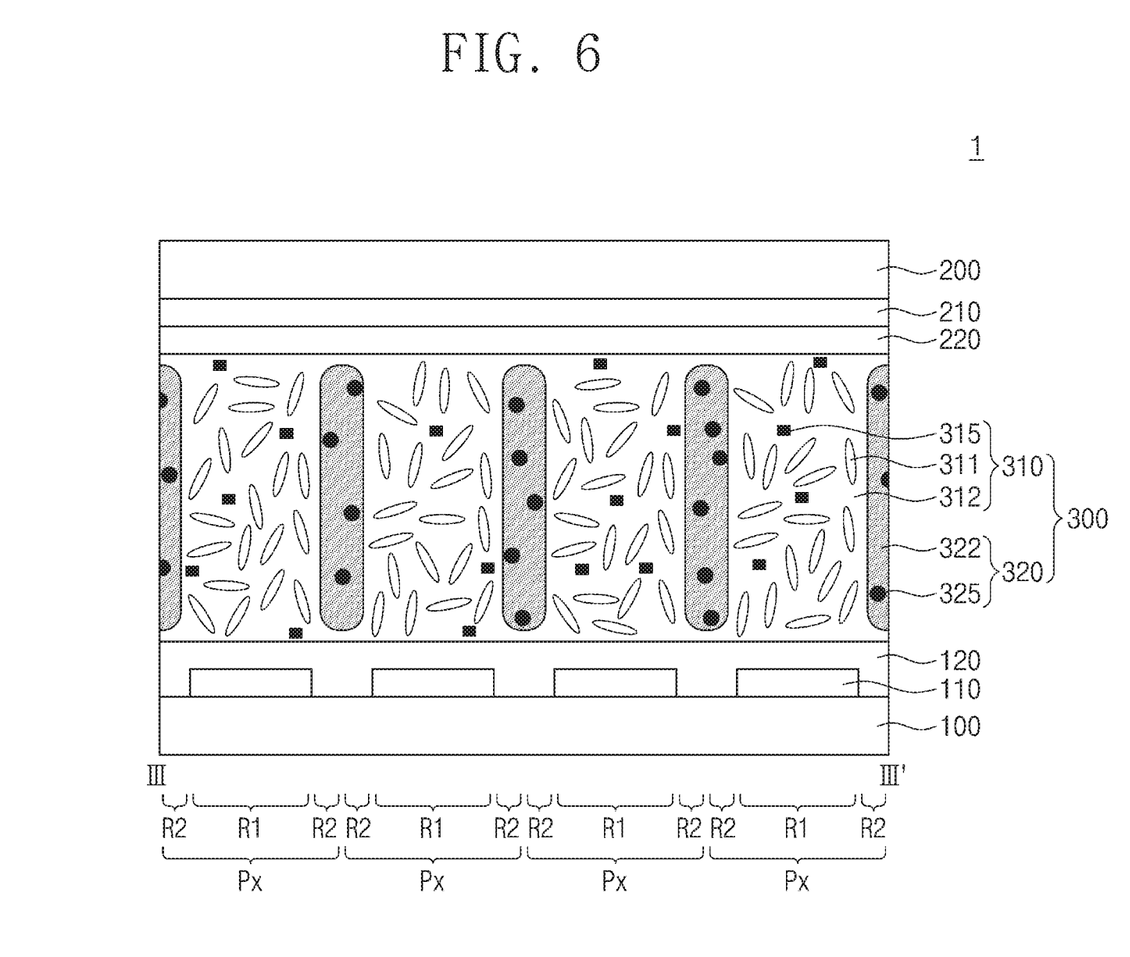
FIG. 6 is a cross-sectional view taken along line III-III' of FIG. 5.

FIG. 5 is a plan view illustrating a method of operating a liquid crystal element according to an embodiment. FIG. 6 is a cross-sectional view taken along line III-III' of FIG. 5.

In FIGS. 5 and 6, the liquid crystal element 1 may be in a state where no voltage difference is formed between the first electrode 110 and the second electrode 210. For example, no voltage may be applied to the first electrode 110 and the second electrode 210. As another example, the first voltage and the second voltage may be applied to the first electrode 110 and the second electrode 210, respectively, and the second voltage may be the same as the first voltage. The hydrophobic portion 320 may overlap the second areas R2 of the pixel areas Px of the liquid crystal layer 300. In the vertical view, the first dye 315 may overlap the first area. The second dye 325 may overlap the second area. The first dye 315 may have a first color, and the second dye 325 may have a second color. The first color and the second color may be different colors.

The liquid crystal molecules 311 of the liquid crystal portion 310 are not aligned and may be arranged in disorder. Light incident on the liquid crystal portion 310 may be scattered in the liquid crystal portion 310 by the liquid crystal molecules 311 and a plurality of first dyes 315. Light scattered and transmitted through the liquid crystal portion 310 may have a first color. When the liquid crystal molecules 311 are arranged in disorder, incident light may be more scattered in the liquid crystal portion 310 than when the liquid crystal molecules 311 are aligned. Accordingly, the optical path in the liquid crystal portion 310 may be longer.

Light incident on the hydrophobic portion 320 may be scattered in the hydrophobic portion 320 by a plurality of second dyes 325. Light scattered and transmitted through the hydrophobic portion 320 may have a second color. Since the hydrophobic materials 322 are transparent, most of the light incident on the hydrophobic portion 320 is not scattered and can pass through the hydrophobic portion 320. The optical path within the hydrophobic portion 320 may be relatively short. In this case, the light emitted by the liquid crystal element may include light of the first color transmitted through the liquid crystal portion 310 and light of the second color transmitted through the hydrophobic portion 320. The light emitted by the liquid crystal element may have a mixed color of the first color and the second color. The light having the first color may have a first wavelength. The light having the second color may have a second wavelength. The first wavelength and the second wavelength may be different from each other. The intensity of light of the first wavelength among the light emitted by the liquid crystal element may be greater than the intensity of light of the second wavelength.

Referring to FIGS. 3 and 4, a voltage difference may occur between the first electrode 110 and the second electrode 210. For example, a third voltage may be applied to the first electrode 110, and a fourth voltage may be applied to the second electrode 210. The fourth voltage may be different from the third voltage. Due to the voltage difference, the liquid crystal molecules 311 may have a directivity and may be regularly aligned. As shown in FIG. 4, the liquid crystal molecules 311 may be aligned in a direction perpendicular to the upper surface of the first substrate 100. The alignment direction of the liquid crystal molecules 311 is not limited to this and may be variously modified. When the liquid crystal molecules 311 are aligned, incident light may be less scattered within the liquid crystal portion 310 compared to when the liquid crystal molecules 311 are arranged in disorder. Accordingly, the optical path in the liquid crystal portion 310 may be shorter.

The arrangement of the hydrophobic materials 322 and the second dyes 325 may not be directly affected by the electric field. The color of light transmitted through the hydrophobic portion 320 may be substantially the same as the color when a voltage difference does not occur between the first electrode 110 and the second electrode 210. In this case, the light emitted by the liquid crystal element may include light of the first color transmitted through the liquid crystal portion 310 and light of the second color transmitted through the hydrophobic portion 320. The light emitted by the liquid crystal element may have a mixed color of the first color and the second color. The light having the first color may have a first wavelength. The light having the second color may have a second wavelength. The first wavelength and the second wavelength may be different from each other. Among the light emitted by the liquid crystal element, the intensity of light of the first wavelength and the intensity of light of the second wavelength may be substantially the same.

The liquid crystal element according to the embodiment may or may not align the liquid crystal molecules 311 by applying different voltages to the first electrode 110 and the second electrode 210. Accordingly, the color and intensity of light passing through the liquid crystal portion 310 may be changed. Since the light emitted by the liquid crystal element has a color mixture of the color of the light transmitted through the liquid crystal portion 310 and the color of the light transmitted through the hydrophobic portion 320, a liquid crystal element having a dichroic color may be realized by different materials or different concentrations of the first dyes 315 and the second dyes 325. The liquid crystal element may not require a separate color filter, polarizer, or backlight. Accordingly, a high-transparent display can be realized by minimizing light loss.

Figure 7:
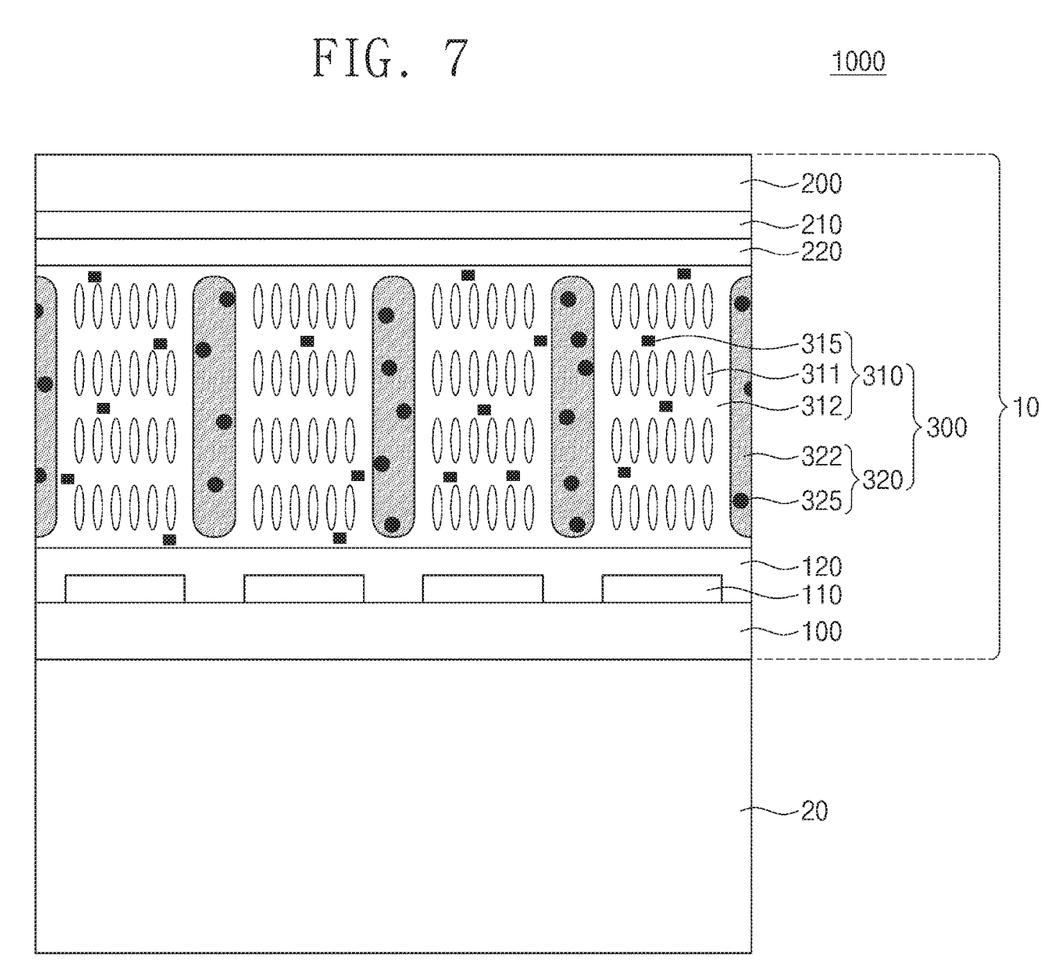
FIG. 7 is a cross-sectional view showing a display device according to an embodiment.

Referring to FIG. 57, the display device 1000 may include a light emitting element 20 and a liquid crystal element 10. The light emitting element 20 may emit light to the liquid crystal element 10.

The liquid crystal element 10 may be provided on the light emitting element 20. The liquid crystal element 10 may include the liquid crystal element 1 of FIGS. 1 to 6. In this case, the operation method of the liquid crystal element 10 may be substantially the same as that described in the operation of the liquid crystal element 1 of FIGS. 3 to 6. The display device 1000 may function as a hologram display device. The light emitting device 20 may include a backlight unit. The liquid crystal element 10 may function as a light modulator. The display device 1000 is not limited to the hologram display device, and may be applied to various fields.

According to embodiments of the inventive concept, the liquid crystal element may include a liquid crystal portion and a hydrophobic portion in the liquid crystal layer. The liquid crystal portion and the hydrophobic portion may include a first dye and a second dye. When the liquid crystal portion and the hydrophobic portion are phase-separated, the color materials are also phase-separated to realize a color image. Accordingly, the manufacturing of the liquid crystal element can be more simplified by implementing a color image without a separate color filter or polarizing plate.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A liquid crystal element comprising:
   a first substrate;
   a first electrode provided on the first substrate;
   a liquid crystal layer provided on the first electrode and including a liquid crystal portion and a hydrophobic portion; and
   a second electrode on the liquid crystal layer,
   wherein the hydrophobic portion is phase-separated from the liquid crystal portion,
   wherein the liquid crystal portion comprises polymer materials, a first dye, and liquid crystal molecules dispersed in the polymer materials,
   wherein the hydrophobic portion is spaced apart from the first electrode,
   wherein the hydrophobic portion includes hydrophobic materials and a second dye,
   wherein the first dye is dissolved in the polymer materials,
   wherein the second dye is dissolved in the hydrophobic portion,
   wherein the polymer materials include photo-curable polymer materials.

2. The liquid crystal element of claim 1, wherein the photo-curable polymer material is cured by ultraviolet light.

3. The liquid crystal element of claim 2, wherein the ultraviolet light has a wavelength of 250 nm or more and 400 nm or less.

4. The liquid crystal element of claim 1, wherein the substrate has a plurality of pixel areas,
   wherein each of the pixel areas has a first area and a second area,
   wherein the first area overlaps the first electrode vertically,
   wherein in a planar perspective, the second area surrounds the first area.

5. The liquid crystal element of claim 4, wherein a first voltage is applied to the first electrode,
   wherein a second voltage different from the first voltage is applied to the second electrode,
   wherein the liquid crystal molecules are vertically aligned with each other,
   wherein a refractive index of the polymer materials coincides with a refractive index of the liquid crystal molecules.

6. The liquid crystal element of claim 5, wherein the hydrophobic portion overlaps the second area vertically,
   wherein in a planar perspective, the hydrophobic portion is spaced apart from the first area.

7. The liquid crystal element of claim 5, wherein the liquid crystal layer is transparent,
   wherein light incident on the liquid crystal layer is transmitted through the liquid crystal layer.

8. The liquid crystal element of claim 4, wherein the hydrophobic portion overlaps the second area vertically,
   wherein the liquid crystal molecules are arranged in disorder.

9. The liquid crystal element of claim 4, wherein the liquid crystal molecules overlap the first area in a planar perspective,
   wherein a refractive index of the polymer materials is different from a refractive index of the liquid crystal molecules.

10. The liquid crystal element of claim 9, wherein the first dye has a first color,
    wherein the second dye has a second color different from the first color,
    wherein light transmitted through the liquid crystal layer has a mixed color of the first color and the second color.

11. The liquid crystal element of claim 10, wherein light having the first color has a first wavelength,
    wherein light having the second color has a second wavelength,
    wherein a light intensity of the light having the first wavelength is greater than a light intensity of the light having the second wavelength.

12. The liquid crystal element of claim 1, wherein a dielectric constant of the hydrophobic portion is lower than a dielectric constant of the liquid crystal portion,
    wherein the hydrophobic portion has a dielectric constant of 1 or more and 3 or less.

13. The liquid crystal element of claim 1, wherein a thickness of the liquid crystal layer is 2.5 um or more and 60 um or less.

14. The liquid crystal element of claim 1, wherein a refractive index of the hydrophobic portion is different from a refractive index of the liquid crystal portion,
    wherein the refractive index of the hydrophobic portion is 1.25 or more and 1.45 or less.

15. The liquid crystal element of claim 1, wherein the second dye is contained in 0.001 wt % or more and 50 wt % or less of the hydrophobic portion.

* * * * *